Nov. 25, 1958 — V. A. MISEK — 2,862,188
ELECTROMAGNETIC MODULATOR DEVICE
Filed June 17, 1954 — 3 Sheets-Sheet 1

Victor A. Misek
INVENTOR.
BY
Attorney

Victor A. Misek
INVENTOR.

Victor A. Misek

United States Patent Office 2,862,188
Patented Nov. 25, 1958

2,862,188
ELECTROMAGNETIC MODULATOR DEVICE

Victor A. Misek, Nashua, N. H., assignor, by mesne assignments, to Sanders Associates, Incorporated, Nashua, N. H., a corporation of Delaware Application June 17, 1954, Serial No. 437,501

7 Claims. (Cl. 332—51)

This invention relates to electromagnetic devices. More particularly, the present invention relates to electromagnetic modulators as used to produce amplitude modulation and suppressed carrier balanced modulation.

Many devices have been proposed in the prior art for developing an amplitude modulated carrier frequency as, for example, is employed in radio-telephony. Since the information to be transmitted is carried by the sidebands, the efficiency of transmission is relatively low in systems of the prior art in that the power of one of the sidebands, at 100 percent modulation, is only 25 percent of the power of a carrier which carries no information.

Recently a device, known in the art as "balanced modulator," has been developed, wherein only the information carrying sideband frequencies appear in the output. The use of balanced modulators in this manner is commonly referred to as "suppressed carrier modulation." These devices ordinarily are characterized by frequency instabilities due to variations of temperature and humidity. Furthermore, they are relatively expensive and complex when used for high powered transmission.

It is therefore an object of the present invention to provide an improved electromagnetic modulator which provides suppressed carrier modulation.

It is a further object of the present invention to provide an improved electromagnetic device for providing amplitude modulation and preferably one which functions without the use of vacuum tubes.

A still further object of the present invention is to provide an improved electromagnetic modulator which is inherently stable and economical in its design and operation.

Other and further objects of the invention will be apparent from the following description of preferred embodiments thereof, taken in connection with the accompanying drawings.

In accordance with the invention, there is provided a magnetic modulator having a core of magnetic material. Magnetizing means are coupled to the core for inducing in the core a pair of opposing flux-paths for developing flux nulls at the regions of junction of the flux paths. A modulation-signal winding is provided on the core in the vicinity of one of the flux path junctions for applying a modulation signal for varying the relative flux strengths in the paths to oscillate the flux nulls. An output winding is provided on the core in the vicinity of one of the flux path junctions. The output winding is responsive to the variations of the flux strengths and, particularly, to the motion of the flux nulls resulting from the variations. Means are provided for coupling a carrier-wave signal to the core for applying a carrier-wave signal to further vary the flux strengths, whereby the physical positioning of the flux nulls oscillate at frequencies which are the algebraic sum of the modulation and carrier-wave signals resulting in the developing of modulation sidebands of the carrier-wave signal in the output winding.

Figure 1:
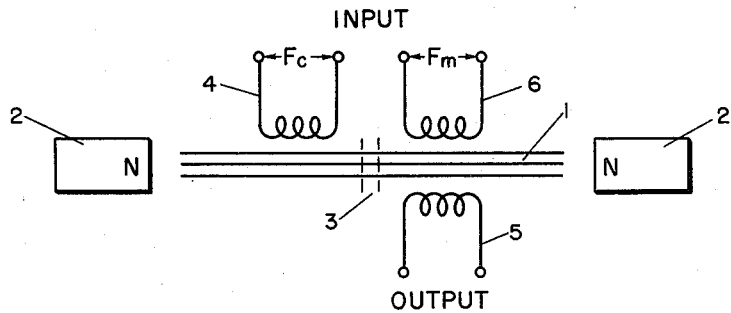
Fig. 1 is a schematic circuit diagram illustrating a preferred embodiment of the present invention.
Figure 3:
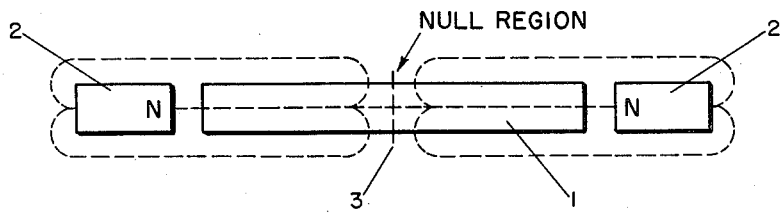
Fig. 3 is a diagram illustrating magnetic field relations in the present invention.

Referring now to the drawings and with particular reference to Figs. 1 and 3, a ferromagnetic core 1 has opposing magnetic fields applied thereto by permanent magnets 2 disposed, as shown, at its ends. The permanent magnets 2 provide a magnetizing means coupled to the core for inducing in the core a pair of opposing flux-paths for developing flux nulls at the regions of junction of the flux-paths. The term "ferro-magnetic" as used herein includes all materials having a magnetic permeability greater than 1. Assuming the strength of the magnets 2 to be equal and displaced symmetrically about the center of the core 1, and the core 1 to have a reasonably homogeneous permeability, the null region as indicated at 3 is located where the opposing magnetic fields tend to cancel out each other. As defined above, the region 3 would appear substantially in the center of the core 1. Introduction of a magnetic field in the vicinity of the region 3 tends to increase the strength of one of the fields as provided by one of the magnets 2 and thus decreases the strength of the other to effect a shift in the position of the null region 3. By directing an alternating magnetic field (longitudinally through the core) in the vicinity of the null region, the opposing fields may be varied to effect an oscillatory motion of the null region. A carrier-wave signal having a frequency for example of 10 megacycles is applied to a winding 4 in the vicinity of the null region 3 and the null is thereby caused to oscillate about its zero position, the center of the core 1, at the carrier frequency (see curve (a) of Fig. 4). Simultaneously, a modulation-wave signal having a frequency for example of 20 kilocycles is applied to a coil 6 in the vicinity of the null and the null is thereby caused to oscillate about its zero position at that frequency also (see curve (b) of Fig. 4). The motion of the null with respect to its zero position is illustrated by the curve (c) of Fig. 4. An output winding 5 is provided on the core 1 surrounding it adjacent the null 3, as shown. The winding 5 is thus placed in the vicinity of one of the flux-path junctions and is responsive to the variations of the flux strengths, and, particularly, to the motion of the flux nulls resulting from the variations. The flux variations in the vicinity of the null region induces an alternating voltage in the winding 5 to provide an output for the device. If the modulation and the carrier voltages are so chosen that when applied simultaneously the excursion of the null does not exceed the extremities of the coil 5, the voltage in its output will be a function only of the null positions as illustrated by the positive half of the curve (c) of Fig. 4. The resultant amplitude modulated carrier in the output of the device is illustrated by the curve (d) of Fig. 4. The device as shown produces in its output the original carrier frequency $F_c$, the sum of the carrier and the modulation frequency $F_c+F_m$, and the difference between the carrier and modulation frequencies $F_c-F_m$.

Figure 2:
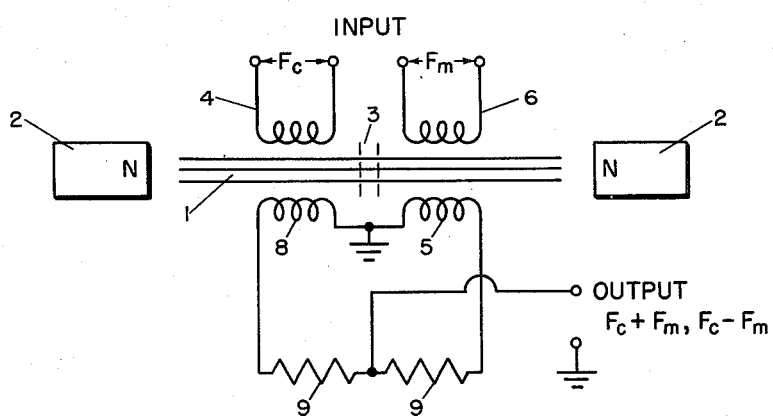
Fig. 2 is a schematic circuit diagram illustrating another embodiment of the present invention.
Figure 4:
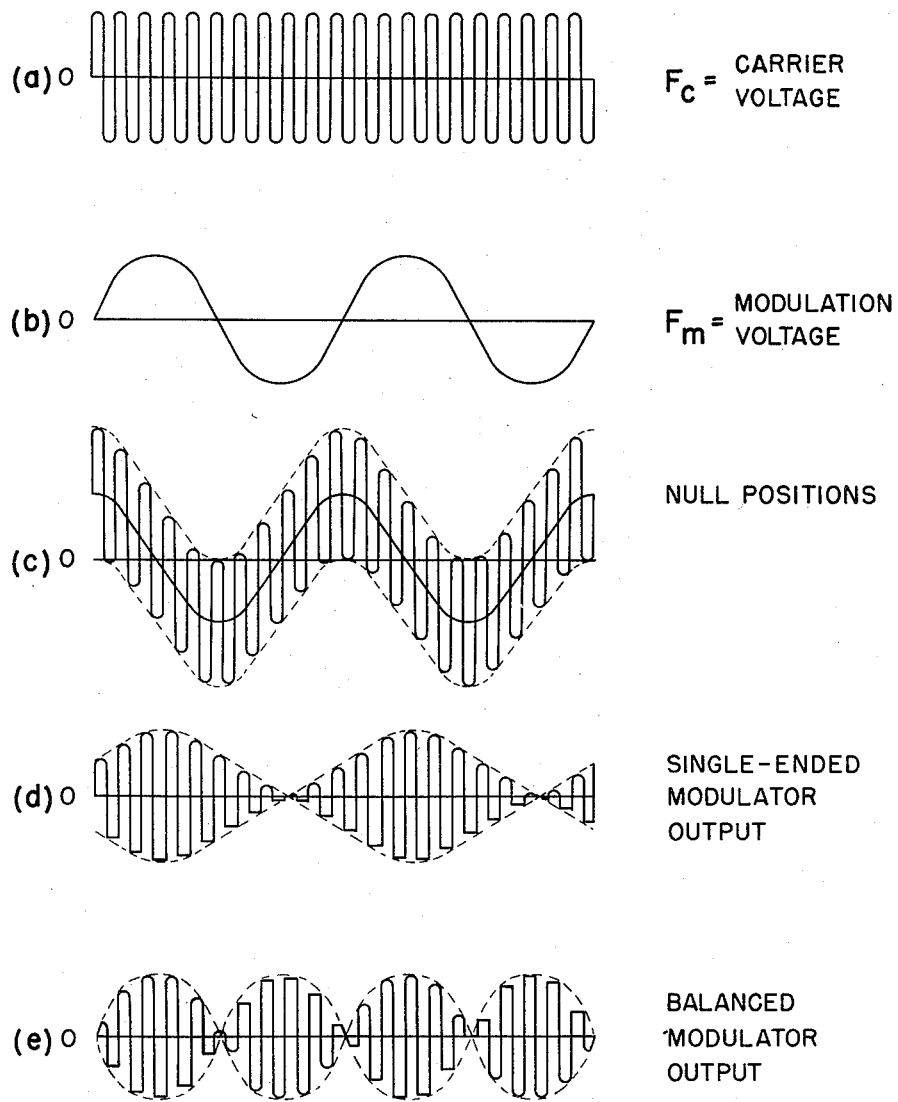
Fig. 4 is a series of wave forms illustrating the operation of the present invention.

In the embodiment of the invention shown in Fig. 2, the device is in a modified form of an electromagnetic balanced modulator. A winding 8 adjacent the other side of the null has one end connected to a coil and one end to the winding 5 as shown. The other ends of the windings 5 and 8 are connected to a summing device comprising the resistors 9. In this case the null appears in the coil 5 during the positive half of the curve (c) of Fig. 4, and in the coil 8 during the negative half of the curve (c) as shown in Fig. 4.

The output voltage may be taken as shown from the junction point between the two resistors 9 and ground as shown and only the sideband frequencies are present therein. It is characteristic of this device that the original input frequencies, for example, the carrier frequency $F_c$ and the modulation frequency $F_m$ are suppressed. The output frequencies then include the upper sideband, for example, the sum of the input frequencies $F_c+F_m$ and the lower sideband difference frequency $F_c-F_m$.

Figure 5:
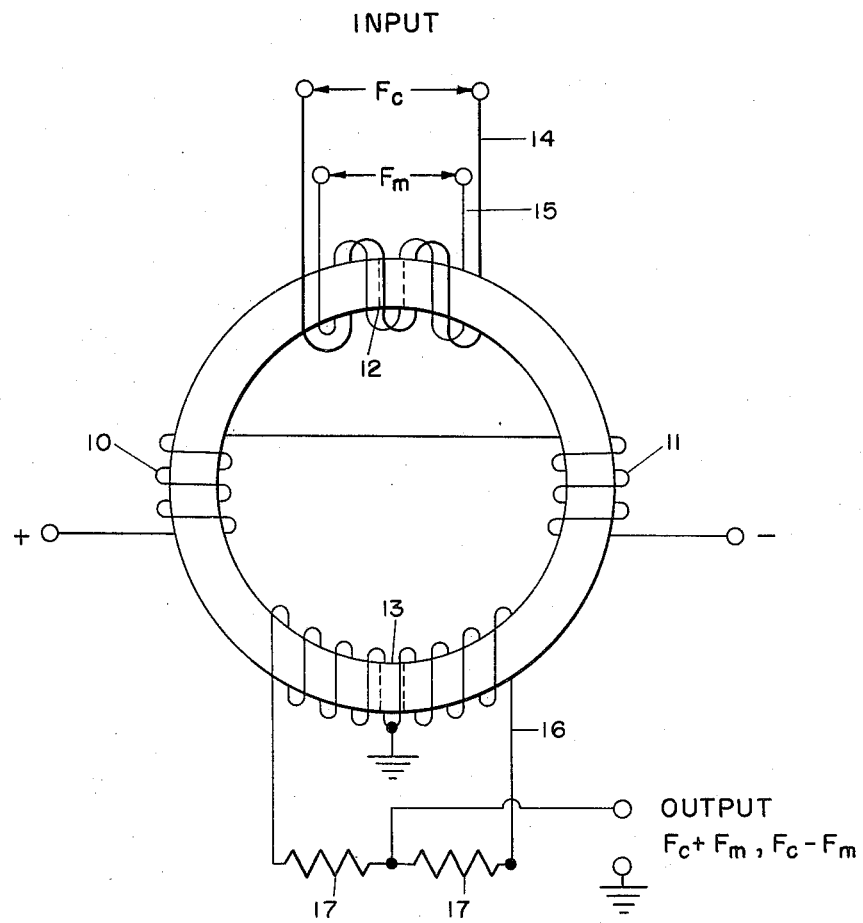
Fig. 5 is a diagrammatic illustration of still another embodiment of the present invention.

In Fig. 5 a further modification of the embodiment in Fig. 2 is shown, which employs a ferro-magnetic core in the configuration of a ring. The opposing steady-state magnetic fields are supplied by a D. C. current passing through toroidal windings 10 and 11, which are connected together and to a source of D. C. voltage polarized as shown. In this case the lines of flux of the opposing fields produce two null regions as indicated at 12 and 13. The input toroidal windings 14 and 15 surround the null region 12. Oscillatory motion of the null 12 produces a corresponding motion of the null 13 to induce a voltage output in the toroidal winding 16. The center tap of the winding 16 is grounded and the other ends are connected to a summing device comprising resistors 17. Here again, the output voltage is taken from the junction between the resistors 17 and ground.

By resonating the winding 5 in Fig. 2 to a frequency of 455 kilocycles, for example, and applying to the windings 4 and 6 the outputs of a local oscillator and incoming radio signal, the device may be used as a mixer to produce an intermediate frequency in a super heterodyne receiver. The application of the present invention to numerous modulation and frequency mixing functions is clear.

The embodiment of Fig. 2 is adapted for operation with a carrier frequency of 2.25 megacycles and a modulation frequency in the audio range, in particular 1,000 cycles per second. Here, the secondary windings 4 and 6 are each formed of four turns of #18 solid wire with a plastic coating having an outside diameter of .060 of an inch. The secondary windings 8 and 5 are each formed of thirty-two turns of #22 enameled wire which were tuned with 150 micro-microfarad capacitors in parallel with each winding. The resistors 9 are 100,000 ohms. The core 1 is 4 inches long being .234 inch in diameter and composed of ML 1331 ferrite material as manufactured by General Ceramics and Steatite Corporation. The permanent magnets 2 are horseshoe magnets having a residual magnetism of 7500 gausses.

While there has been hereinbefore described what are at present considered preferred embodiments of the invention, it will be apparent that many and various changes and modifications may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. An electromagnetic device comprising an integral, one-piece, continuous, elongated ferromagnetic core; a first permanent magnet applying a static magnetic field through said core from an end thereof; a second permanent magnet applying a static magnetic field through said core in opposition to the first said static field from the other end of said core, said second static field being of such strength in opposition to the first said static field as to create a null region at a predetermined position in said core; means applying an alternating magnetic field through said core for varying said opposing fields to effect an oscillatory motion of said null region in said core; and means responsive to said motion of said null region and said variations of said opposing fields producing an output voltage for the device.

2. A magnetic modulator comprising: a core of magnetic material; magnetizing means coupled to said core for inducing in said core a pair of opposing flux paths for developing flux nulls at the regions of junction of said flux paths; a modulation-signal winding on said core in the vicinity of one of said flux-path junctions for applying a modulation signal for varying the relative flux strengths in said paths to oscillate said flux nulls; an output winding on said core in the vicinity of one of said flux-path junctions and responsive to said variations of said flux strengths and, particularly, to the motion of said flux nulls resulting from said variations; and means for coupling a carrier-wave signal to said core for applying a carrier-wave signal to further vary said flux strengths, whereby the physical positioning of said flux nulls oscillate at frequencies which are the algebraic sum of the modulation and carrier-wave signals resulting in the developing of modulation sidebands of said carrier-wave signal in said output winding.

3. A magnetic modulator comprising: a core of magnetic material; a pair of permanent magnets coupled to said core for inducing in said core a pair of opposing flux paths for developing flux nulls at the regions of junction of said flux paths; a modulation-signal winding on said core in the vicinity of one of said flux-path junctions for applying a modulation signal for varying the relative flux strengths in said paths to oscillate said flux nulls; an output winding on said core in the vicinity of one of said flux-path junctions and responsive to said variations of said flux strengths and, particularly, to the motion of said flux nulls resulting from said variations; and means for coupling a carrier-wave signal to said core for applying a carrier-wave signal to further vary said flux strengths, whereby the physical positioning of said flux nulls oscillate at frequencies which are the algebraic sum of the modulation and carrier-wave signals resulting in the developing of modulation sidebands of said carrier-wave signal in said output winding.

4. A magnetic modulator comprising: an elongated core of magnetic material; a pair of permanent magnets opposingly coupled to opposite ends of said core for inducing in said core a pair of opposing flux paths for developing a flux null at the region of junction of said flux paths in the vicinity of the center of said core; a modulation-signal winding on said core in the vicinity of said flux-path junction for applying a modulation signal for varying the relative flux strengths in said paths to oscillate said flux null; an output winding on said core in the vicinity of said flux-path junction and responsive to said variations of said flux strengths and, particularly, to the motion of said flux null resulting from said variations; and means for coupling a carrier-wave signal to said core for applying a carrier-wave signal to further vary said flux strengths, whereby the physical positioning of said flux null oscillates at frequencies which are the algebraic sum of the modulation and carrier-wave signals resulting in the developing of modulation sidebands of said carrier-wave signal in said output winding.

5. A magnetic modulator comprising: an annular core of magnetic material; electromagnetic magnetizing means coupled to said core at diametrically opposite areas for inducing in said core a pair of opposing flux paths for developing flux nulls at the regions of junction of said flux paths; a modulation-signal winding on said core in the vicinity of one of said flux-path junctions for applying a modulation signal for varying the relative flux strengths in said paths to oscillate said flux nulls; an output winding on said core in the vicinity of another of said flux-path junctions and responsive to said variations of said flux strengths and, particularly, to the motion of said flux nulls resulting from said variations; and a carrier-signal winding on said core in the vicinity of said one flux-path junction for applying a carrier-wave signal to further vary said flux strengths, whereby the physical positioning of said flux nulls oscillate at frequencies which are the algebraic sum of the modulation and carrier-wave signals resulting in the developing of modulation sidebands of said carrier-wave signal in said output winding.

6. A magnetic modulator comprising: an annular core of magnetic material; a pair of electromagnetic windings coupled to said core at diametrically opposite areas for inducing in said core a pair of opposing flux paths for developing flux nulls at the regions of junction of said flux paths; a modulation-signal winding on said core in the vicinity of one of said flux-path junctions for applying a modulation signal for varying the relative flux strengths in said paths to oscillate said flux nulls; an output winding on said core in the vicinity of another of said flux-path junctions and responsive to said variations of said flux strengths and, particularly, to the motion of said flux nulls resulting from said variations; and a carrier-signal winding on said core bifilar with said modulation-signal winding for applying a carrier-wave signal to further vary said flux strengths, whereby the physical positioning of said flux nulls oscillate at frequencies which are the algebraic sum of the modulation and carrier-wave signals resulting in the developing of modulation sidebands of said carrier-wave signal in said output winding.

7. A magnetic modulator comprising: a core of magnetic material; magnetizing means coupled to said core for inducing in said core a pair of opposing flux paths for developing flux nulls at the regions of junction of said flux paths; a modulation-signal winding on said core in the vicinity of one of said flux-path junctions for applying a modulation signal for varying the relative flux strengths in said paths to oscillate said flux nulls; a balanced output winding on said core in the vicinity of one of said flux-path junctions and responsive to said variations of said flux strengths and, particularly, to the motion of said flux nulls resulting from said variations; and another winding on said core for applying a carrier-wave signal to further vary said flux strengths, whereby the physical positioning of said flux nulls oscillate at frequencies which are the algebraic sum of the modulation and carrier-wave signals resulting in the developing of modulation sidebands of said carrier-wave signal in said output winding.

References Cited in the file of this patent

UNITED STATES PATENTS

| | | |
|---|---|---|
| 1,597,323 | Massolle et al. | Aug. 24, 1926 |
| 2,254,943 | Galle | Sept. 2, 1941 |
| 2,297,251 | Schild | Sept. 29, 1942 |
| 2,401,384 | Young | June 4, 1946 |
| 2,591,406 | Carter et al. | Apr. 1, 1952 |
| 2,659,866 | Landon | Nov. 17, 1953 |

FOREIGN PATENTS

| | | |
|---|---|---|
| 993,144 | France | Oct. 26, 1951 |